(12) United States Patent
Matsumoto et al.

(10) Patent No.: US 10,112,455 B2
(45) Date of Patent: Oct. 30, 2018

(54) TORSION BEAM SUSPENSION (71) Applicant: Yorozu Corporation, Yokohama (JP)

(72) Inventors: Masaharu Matsumoto, Yokohama (JP); Yuki Usami, Yokohama (JP)

(73) Assignee: Yorozu Corporation, Yokohama (JP)

( * ) Notice: Subject to any disclaimer, the term of this patent is extended or adjusted under 35 U.S.C. 154(b) by 56 days.

(21) Appl. No.: 15/129,617

(22) PCT Filed: Mar. 27, 2014

(86) PCT No.: PCT/JP2014/059025
§ 371 (c)(1),
(2) Date: Sep. 27, 2016

(87) PCT Pub. No.: WO2015/145699
PCT Pub. Date: Oct. 1, 2015

(65) Prior Publication Data
US 2017/0144503 A1    May 25, 2017

(51) Int. Cl.
*B60G 21/05*    (2006.01)
*B60G 17/02*    (2006.01)

(52) U.S. Cl.
CPC ......... *B60G 21/051* (2013.01); *B60G 17/025* (2013.01); *B60G 2200/31* (2013.01);
(Continued)

(58) Field of Classification Search
CPC ............... B60G 21/051; B60G 17/025; B60G 2500/22; B60G 2200/31; B60G 2206/20; B60G 2206/80
See application file for complete search history.

(56) References Cited

U.S. PATENT DOCUMENTS 5,409,254 A    4/1995  Minor et al.
6,059,314 A *  5/2000  Streubel ............... B60G 21/051
                                              280/124.153
(Continued)

FOREIGN PATENT DOCUMENTS

JP    2001088525 A    4/2001
JP    2009501113 A    1/2009
(Continued)

OTHER PUBLICATIONS

Supplementary European Search Report for Application No. EP 14 88 7365, dated Mar. 13, 2017.
(Continued)

*Primary Examiner* — Darlene P Condra
(74) *Attorney, Agent, or Firm* — Drinker Biddle & Reath LLP (57) ABSTRACT

A torsion beam suspension capable of preventing an abrupt rigidity change in a connection part between a trailing arm and a torsion beam is provided.
The present invention is characterized in that in a torsion beam suspension 100 in which to right and left trailing arms 50 extending in a front-rear direction of a vehicle body and swinging vertically, a torsion beam 16 extending in a right and left direction of the vehicle body is joined, two or more types of rigidity adjustment portions 15, 18, 24 and 25 which adjust a rigidity from the trailing arms to the torsion beam are disposed with positions of the rigidity adjustment portions displaced from each other.

5 Claims, 6 Drawing Sheets (52) U.S. Cl.
CPC ...... *B60G 2206/20* (2013.01); *B60G 2206/80* (2013.01); *B60G 2500/22* (2013.01)

(56) References Cited

U.S. PATENT DOCUMENTS

| | | | |
|---|---|---|---|
| 6,152,468 A * | 11/2000 | Glaser | B60G 21/051 |
| | | | 280/124.134 |
| 7,204,498 B2 * | 4/2007 | Alesso | B60B 35/007 |
| | | | 280/124.106 |
| 7,878,518 B2 | 2/2011 | De Pompignan | |
| 8,646,789 B2 | 2/2014 | Ohdo et al. | |
| 2004/0032106 A1 | 2/2004 | Park | |
| 2007/0108714 A1 | 5/2007 | Kim et al. | |
| 2009/0066050 A1 * | 3/2009 | De Pompignan | B60B 35/08 |
| | | | 280/124.134 |

FOREIGN PATENT DOCUMENTS

| | | |
|---|---|---|
| JP | 2010208549 A | 9/2010 |
| WO | WO-2012011482 A1 | 1/2012 |

OTHER PUBLICATIONS

International Search Report (English translation) for PCT/JP2014/059025 dated Aug. 19, 2014.
International Search Report (in Japanese) with Written Opinion of International Searching Authority for PCT/JP2014/059025 dated Aug. 19, 2014.
Korean Office Action with English Translation of Korean Application No. 10-2016-7025288, dated Apr. 26, 2018.
Japanese Office Action with English Translation for Japanese Application No. 2016-509780, dated Mar. 6, 2018.

* cited by examiner

TORSION BEAM SUSPENSION

CROSS-REFERENCE TO RELATED APPLICATIONS

This application is a national stage application (under 35 U.S.C. § 371) of PCT/JP2014/059025, filed Mar. 27, 2014, which is incorporated herein by reference in its entirety.

TECHNICAL FIELD

The present invention relates to a torsion beam suspension which suspends a wheel of a vehicle by a suspension having a torsion beam.

BACKGROUND ART

In a torsion beam suspension, in general, a torsion beam is arranged between a pair of right and left trailing arms arranged in a front-rear direction of a vehicle, and both end portions of the torsion beam are welded to the trailing arms.

The trailing arms joined to both ends of the torsion beam each have an upper member and a lower member. The upper member and the lower member form a hollow structure, and the upper member is continuously formed with the torsion beam (See Patent Literature 1).

CITATION LIST

Patent Literatures

Patent Literature 1: JP 2010-208549 A

SUMMARY OF INVENTION

Technical Problem

While a trailing arm is provided with a vehicle body attachment part and a tire connection part, a torsion beam has a shape of a beam as its name. Therefore, from the trailing arm to the torsion beam, the vehicle body attachment part and the tire connection part are shaped to merge toward the torsion beam. In such a shape, a shape of a section is liable to abruptly change and a rigidity of a connection part from the trailing arm to the torsion beam is liable to abruptly change and therefore reinforcement of the part is required.

The present invention has been therefore made in order to solve the above-described problem and aims at providing a torsion beam suspension in which an abrupt change in rigidity can be prevented in a connection part between a trailing arm and a torsion beam.

Solution to Problem

The present invention that achieves the above object is a torsion beam suspension having a first member including an opening whose section is formed to have a U-shape, and second members which are arranged in pairs in a right and left direction when mounted on a vehicle and which contact the first member at an edge portion of the U-shaped section in the first member. The suspension has right and left trailing arms which extend in a front-rear direction of the vehicle and are capable of swinging vertically, the trailing arms being formed with a pair of constituent members arranged at the right and left of the first member when mounted on the vehicle and being formed with the pair of the second members; and a U-shaped torsion beam whose section has an opening and which is arranged between the pair of constituent members in the first member. The above suspension is characterized in that two or more types of rigidity adjustment portions, which adjust a rigidity from the trailing arms to the torsion beam, are disposed with positions of the rigidity adjustment portions displaced from each other.

Advantageous Effect of Invention

In the torsion beam suspension according to the present invention, two or more types of rigidity adjustment portions, which adjust a rigidity from the trailing arms to the torsion beam, are disposed with positions of the rigidity adjustment portions displaced from each other. Therefore, it is possible to make a change in rigidity from the trailing arms to the torsion beam shift in a step-by-step manner, thereby preventing an abrupt change in rigidity from the trailing arms to the torsion beam.

DESCRIPTION OF EMBODIMENTS

In the following, an embodiment of the present invention will be described with reference to the drawings. The following description does not limit a scope of a technique and meanings of terms as recited in the scope of claims. Additionally, dimension ratios in the figures are exaggerated for purposes of illustration, which may differ from actual ratios in some cases.

Figure 1:
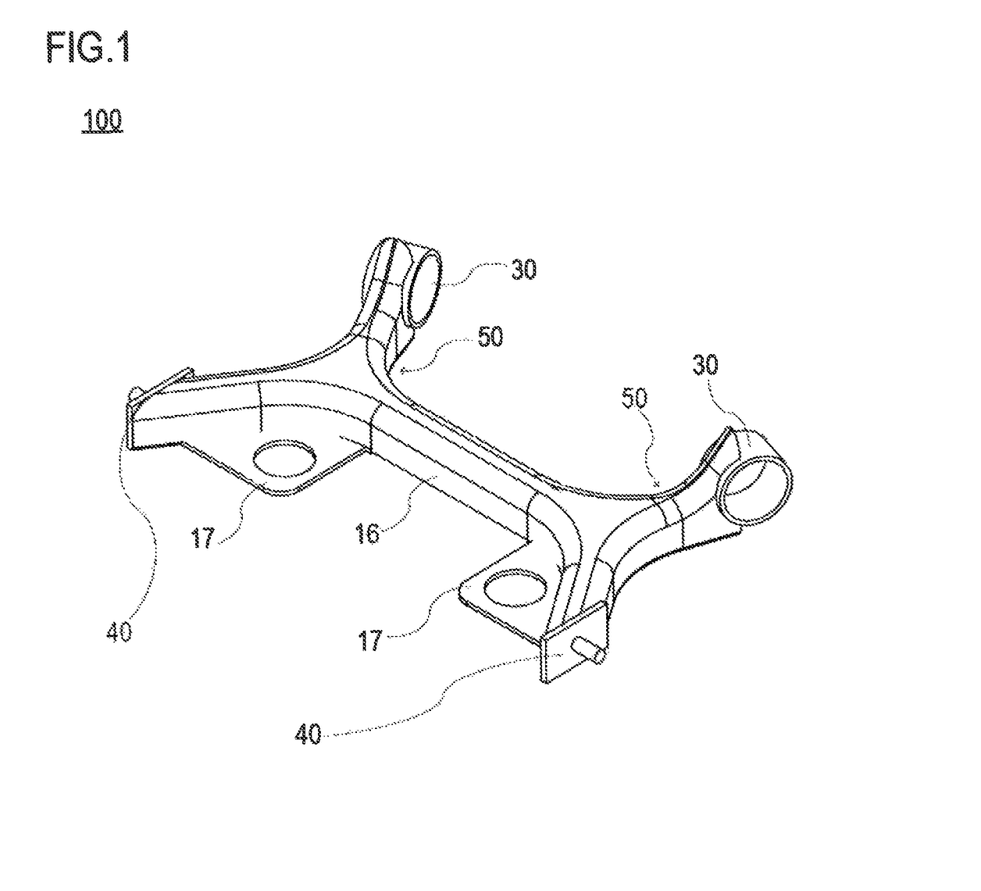
FIG. 1 is a perspective view schematically illustrating a torsion beam suspension according to one embodiment of the present invention.
Figure 2A:
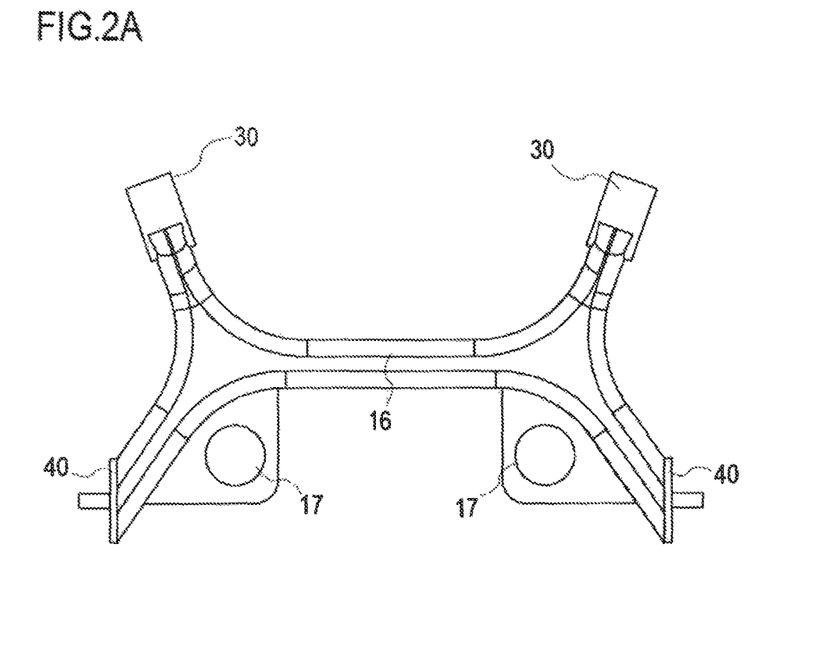
FIG. 2(A) and FIG. 2(B) are a plan view and a bottom view illustrating the suspension, respectively.
Figure 2B:
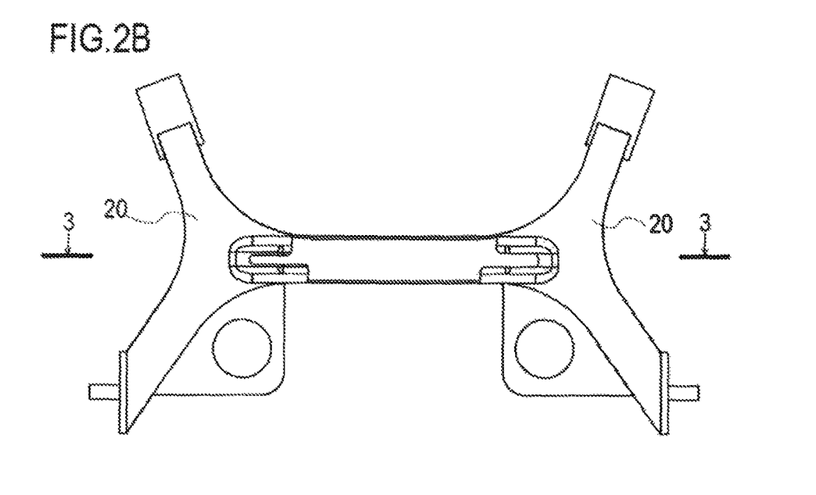
Figure 3:
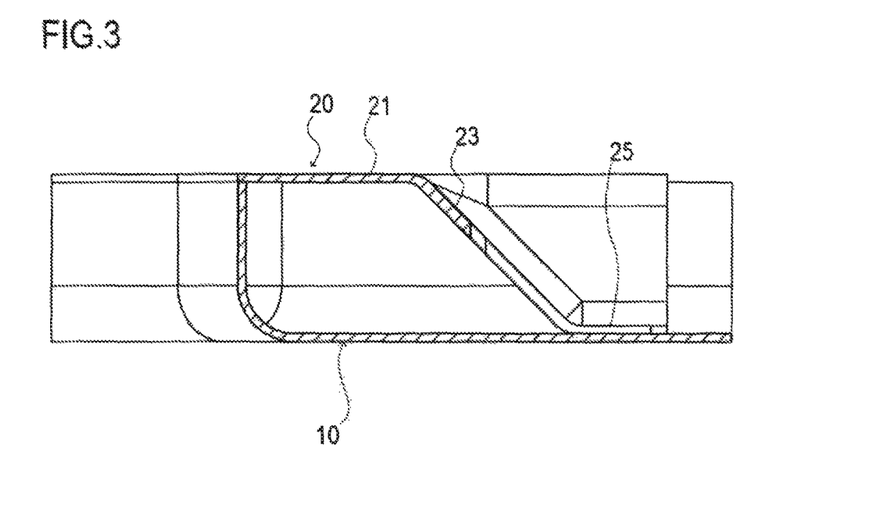
FIG. 3 is a view of a cross-section taken along line 3-3 of FIG. 2(B).
Figure 4A:
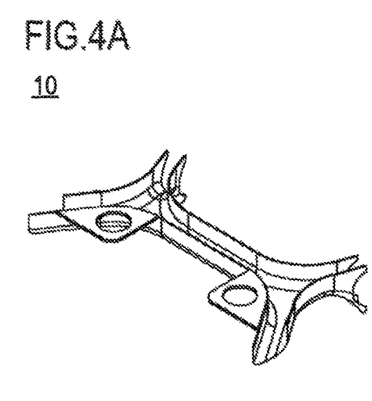
FIG. 4(A) to FIG. 4(C) are a perspective view, a bottom view and a side view illustrating an upper member configuring the suspension, respectively.
Figures 5A, 5B:
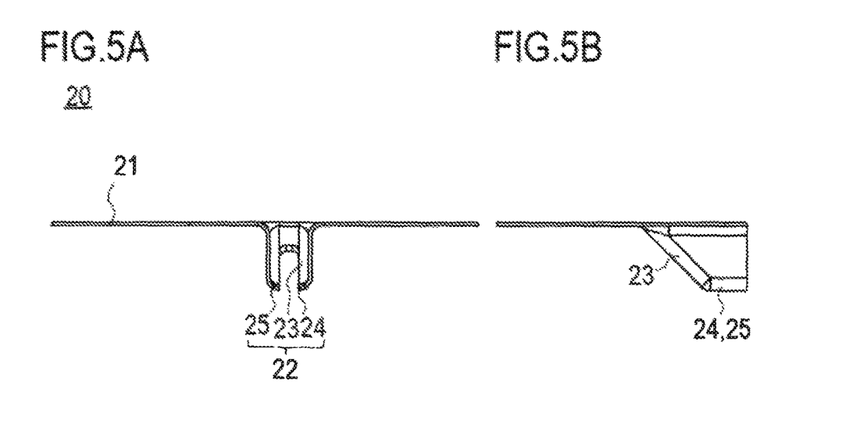
FIG. 5(A) to FIG. 5(D) are a side view, a front view, a perspective view and a bottom view illustrating a lower member configuring the suspension, respectively.
Figure 5C:
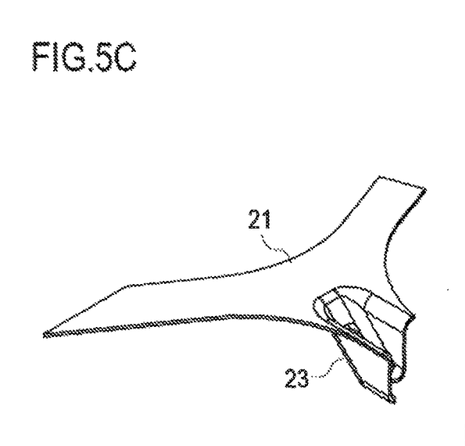
Figure 5D:
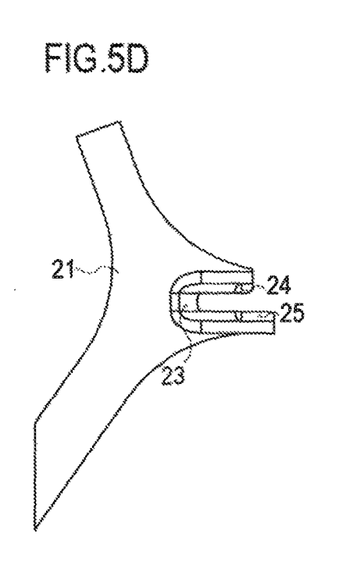
Figure 6:
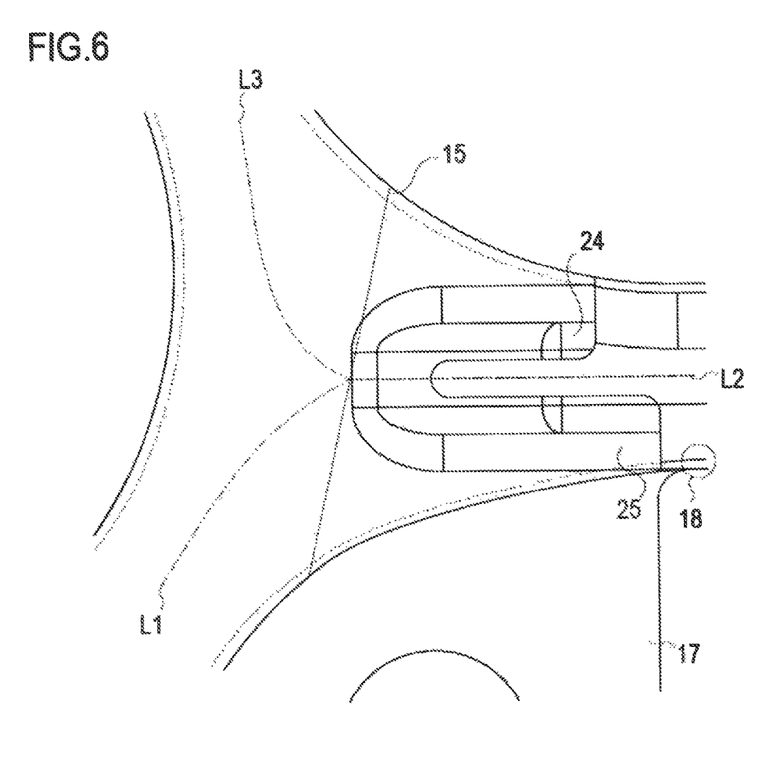
FIG. 6 is an enlarged view illustrating a connection portion between a trailing arm and a torsion beam.

FIG. 1 is a perspective view schematically illustrating a torsion beam suspension according to one embodiment of the present invention, FIG. 2(A) a ad FIG. 2(B) are a plan view and a bottom view illustrating the suspension, respectively, FIG. 3 is a view of a cross-section taken along line 3-3 of FIG. 2(B), and FIG. 4(A) to FIG. 4(C) are a perspective view, a bottom view and a side view illustrating an upper member configuring the suspension, respectively. FIG. 5(A) to FIG. 5(D) are a side view, a front view, a perspective view and a bottom view illustrating a lower member configuring the suspension, respectively, and FIG. 6 is an enlarged view illustrating a connection portion between a trailing arm and a torsion beam.

A torsion beam suspension 100 according to the present embodiment is used as a rear suspension etc. which suspends a rear wheel of FF (front engine front drive) or other vehicle. The suspension 100, as illustrated in FIG. 1, and FIG. 2(A)

and FIG. 2(B), has an upper member 10, a pair of lower members 20, a pair of collars 30, and a pair of spindles 40.

Figure 4B:
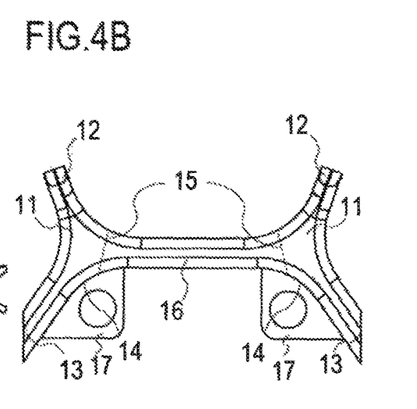
Figure 4C:
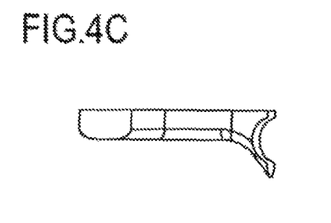

The upper member 10, as illustrated in FIG. 4(B) etc., has a pair of trailing arm component members 11, a torsion beam 16 and a pair of spring sheets 17. The pair of trailing arm component members 11, the pair of lower members 20, the pair of collars 30 and the pair of spindles 40 configure a trailing arm 50. The trailing arms 50, as illustrated in FIG. 2(A) etc., are symmetrically arranged on both ends of the torsion beam 16 in a right and left direction of the vehicle.

The trailing arm component member 11, as illustrated in FIG. 4(B) etc., functionally has vehicle body connections 12, tire connections 13, spring connections 14, and beam connections 15. The vehicle body connections 12 are formed in the front of the vehicle when mounted on the vehicle. To the vehicle body connections 12, the collars 30 are joined, to which collars 30, bushes are attached.

The tire connections 13 are formed in the rear when mounted on the vehicle, to which the spindles 40 are attached, and tire component parts are connected to the spindles 40. The spring connections 14 are formed at the inner side in the right and left direction when mounted on the vehicle, to corresponding areas of which the spring sheets 17 are joined. The trailing arm component members 11, the torsion beam 16 and the spring sheets 17 are configured as a tailored blank in which plate materials with different plate thicknesses are joined. A part of a plate material between the trailing arm component member 11 and the torsion beam 16 is formed to have a different plate thickness, which part corresponds to the beam connection 15. Thus configuring the beam connection 15 enables adjustment of a rigidity from the trailing arm 50 to the torsion beam 16 (torsion beam as a whole). Configurations of a tailored blank also include a configuration in which other than a different plate thickness, a plurality of plate materials is each made of a different material from each other or a plurality of plate materials each having the same plate thickness and the same material configure a part.

As illustrated in FIG. 4(A), the upper member 10 is formed to have a U-shaped section by press molding, so chat the formation of the U-shape provides an opening. The section of the upper member 10 has such a shape that is merged from the vehicle body connection 12 and the tire connection 13 inward in the right and left direction (from lines L1 and L3 toward line L2, which will be described later) and that has the section continuously changing toward the connection portion with the torsion beam 16. In the present specification, a part at which a change in the shape of the U-shaped section starts from the torsion beam 16 to the trailing arm component member 11 will be referred to as a cross sectional shape change portion 18. The cross sectional shape change portion 18 corresponds to a rigidity adjustment portion. Thus, by configuring a cross sectional shape of the connection between the torsion beam 16 and the trailing arm component member 11 to continuously change, a rigidity change from the trailing arm 50 toward the torsion beam 16 (torsion beam as a whole) can be adjusted. Additionally, the trailing arm component member 11 is joined to the spring sheet 17 at the inner side of the vehicle.

The lower member 20 has the same outline as that of the trailing arm component member 11 in a plan view or in a bottom view. As illustrated in FIG. 5(A) to FIG. 5(D), the lower member 20 has an upper connection 21 and a beam connection 22. The line L1 in FIG. 6 is a line from the side of the tire to the axis L2 of the torsion beam 30, and the line L3 is a line from the side of the vehicle body to the axis L2 of the torsion beam 16. The upper connection 21 is a part to be connected to the trailing arm component member 11 of the upper member 10 at an outer circumference edge portion thereof and in the present embodiment, is formed to be generally flat, but may have a undulating shape other than the above-described shape.

The beam connection 22 has a shape in the vicinity of connection to the torsion beam 16. As illustrated in FIG. 5(A), the beam connection 22 has a inclined portion 23, and extension portions 24 and 25. The torsion beam 16 has a U-shaped section as will be described later. In the beam connection 22, for adjusting a rigidity of the connection between the torsion beam 16 and the trailing arm 50, the inclined portion 23 connects the planer upper connection 21 and a curved surface shape of the U-shaped torsion beam 16, from which the extension portions 24 and 25 extend along the curved surface shape in the right and left direction of the vehicle.

The extension portions 24 and 25 extend from the inclined portion 23 to the inner side of the vehicle. The extension portions 24 and 25 correspond to the rigidity adjustment portion. Although a shape extending from the inclined portion 23 is branched into two as the extension portions 24 and 25, the number of branches is not limited to two. The extension portion 24 is arranged on the front side (vehicle body side) and the extension portion 25 is arranged on the rear side (tire side) when mounted on the vehicle. As illustrated in FIG. 6, the extension portion 25 is formed to extend more to the inner side in the right and left direction of the vehicle than the extension portion 24. In other words, the extension portions 24 and 25 are configured to have asymmetrical rigidities centered around the axis of the torsion beam 16. Alternatively, the extension portions 24 and 25 are configured such that a rigidity of a part having a shorter distance from the axial center of the tire is higher. In the present embodiment, the extension portion 25 is closer to the axial center of the tire in distance than the extension portion 24. An input to the suspension is applied through the tire and the torsion beam is twisted by the input. Therefore, the extension portions 24 and 25 formed from the trailing arm 50 to the connection with the torsion beam 16 can appropriately adjust the rigidity by adjusting an extension of the extension portion on the side closer to the axial center of the tire in distance and an extension of the extension portion on the side farther from the same in distance. In the present embodiment, by extending the extension portion 25 closer to the tire input point more to the inner side of the vehicle than the extension portion 24, the rigidity of the connection between the trailing arm 50 and the torsion beam 16 can be efficiently adjusted.

The torsion beam 16 is a beam having a U-shaped section whose bottom is opened when mounted on the vehicle. The torsion beam 16 is arranged between the trailing arms 50 and has right and left end portions joined to the trailing arms 50.

The spring sheet 17 is a fixed end portion to which a spring that absorbs an input from the tire is attached. Since depending on a place in which the spring sheet 17 is disposed, an indoor space of the vehicle body might be narrowed, it is preferably provided in the vicinity of the intersection portion between the torsion beam 16 and the trailing arm 50, for example, as illustrated in FIG. 2(A) and FIG. 2(B).

The upper member 10 and the lower member 20 are each configured with, for example, a hot-rolled steel plate, and each plate material is configured to have a plate thickness of approximately 1.2 mm, but the configuration thereof is not limited thereto.

Next, working effects of the present embodiment will be described. In a torsion, beam suspension, while a connection between a vehicle body and a tire is formed on a trailing arm, because the torsion beam is shaped like a beam as the name represents, a rigidity abruptly changes from the trailing arm toward the connection with the torsion beam due to a change of a cross sectional shape, so that when the torsion beam is twisted by an input from the tire, stress concentration is liable to occur.

In contrast, as illustrated in FIG. 6, the torsion beam suspension 100 according to the present embodiment is configured such that two or more types of rigidity adjustment portions 15, 18, 24, 25, which adjust a rigidity from the trailing arm 50 to the torsion beam 16 (torsion beam as a whole), are disposed with positions of the rigidity adjustment portions displaced each other generally in the right and left direction when mounted on the vehicle. Therefore, a change of a rigidity from the trailing arm 50 toward the torsion beam 16 can be shifted step-by-step, thereby preventing an abrupt rigidity change to avoid or suppress such a phenomenon as stress concentration.

Additionally, the rigidity adjustment portion is configured with the extension portions 24 and 25 which configure the beam connection 22 that connects the torsion beam 16 in the lower member 20. Therefore, separately from a shape of the connection between the trailing arm component member 11 and the torsion beam 16 in the upper member 10, by a position of contact of the beam connection 22 in the lower member 20, a rigidity in the vicinity of the connection can be adjusted.

Additionally, the extension portions 24 and 25 forming the rigidity adjustment portion are configured such that the extension portion 25 having a shorter distance from the axial center of the tire extends snore to the inner side in the direction of the vehicle than the extension portion 24, thereby increasing a rigidity of a part having a shorter distance from the axial center of the tire. Therefore, it is possible to efficiently suppress deformation of the suspension to prevent or suppress stress concentration etc.

Additionally, the extension portions 24 and 25 are configured to have asymmetrical rigidities centered around the axis of the torsion beam 16. This enables adjustment of the rigidity centered around the axis of the torsion beam 16 by shapes of the extension portions 24 and 25 etc. Therefore, adjustment of a rigidity centered around the axis of the torsion beam 16 can be efficiently executed while suppressing a weight or material costs of the torsion beam suspension 100 as a whole.

Additionally, since the extension portions 24 and 25 are formed astride the axis of the torsion beam 16 to have different lengths, the extension portion 24 and the extension portion 25 enable a rigidity of the tire side to be increased more than the vehicle body side, thereby efficiently suppressing an input from the tire to prevent stress concentration etc.

Additionally, such a phenomenon as stress concentration etc. can be efficiently prevented or reduced by forming the trailing arm component member 11, the torsion beam 16 and the spring sheet 17 configuring the upper member 10 by a tailored blank which is obtained by joining a plurality of different kinds of plate materials each having a different plate thickness and by making the beam connection portion 15 whose plate thicknesses changes a part at which a rigidity should be adjusted.

Additionally, the rigidity adjustment portion is configured by continuously changing the shape of the section from the trailing arm component member 11 toward the torsion beam 16 in the ripper member 10. Therefore, also by continuously changing the cross sectional shape from the trailing arm 50 to the torsion beam 16, an abrupt change of a rigidity can be prevented to prevent or suppress such a phenomenon as stress concentration etc.

The present invention is not limited to the above described embodiment, and various modifications can be made within a scope of claims.

Although it has been described that the rigidity adjustment portion is configured by the extension portions 24 and 25, a change in a cross sectional shape from the lines L1 and L3 of the trailing arm 50 to the torsion beam 16, and by a part at which plate thickness changes in the tailored blank, the configuration is not limited thereto. For example, changing the plate thickness of the tailored blank from the trailing arm component member 11 to the torsion beam 16 in a plurality of stages is also included in two or more types of rigidity adjustment portions in the present application. Additionally, within the torsion beam 16, a solid or hollow rod-shaped member (also called roll bar) that improves a torsional stiffness of the torsion beam 16 can be arranged.

Figure 7A:
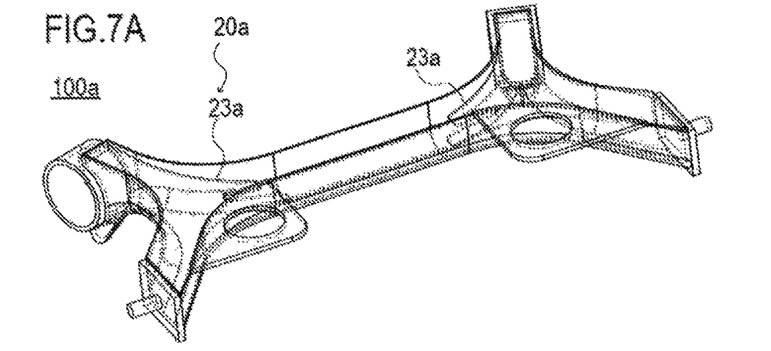
FIG. 7(A) and FIG. 7(B) are perspective views illustrating a torsion beam suspension according to a modification of the present invention.
Figure 7B:
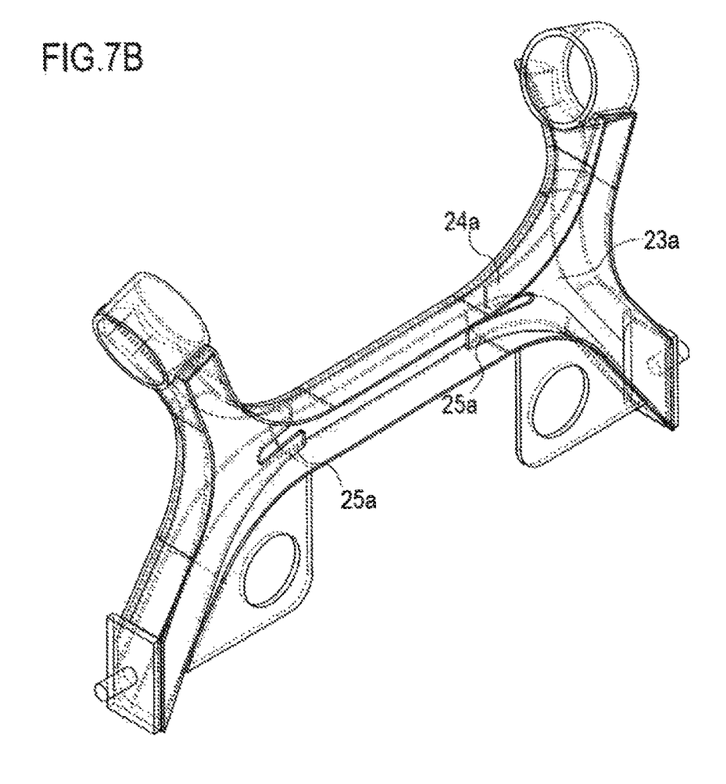

FIG. 7(A) and FIG. 7(B) are perspective views illustrating a torsion beam suspension according to a modification of the present invention. Although the lower member 20 has been described with respect to the embodiment including the planar upper connection 21 and the inclined portion 23 which slants from the upper connection 21 to the bottom of the torsion beam 16, the lower member 20 is not limited thereto. Other than that described above, in a lower member 20a in a suspension 100a, an upper connection and a beam connection are not definitely distinguished, and a inclined portion 23a is formed to slant from a vehicle body connection 12 and a tire connection 13 toward a torsion beam 16, from which extension portions 24a and 25a further extend to the inner side in the right and left direction of the vehicle. Such configuration enables a rigidity adjustment portion to be configured with the lower member 20a from the trailing arm 50 to the torsion beam 16 as well.

REFERENCE SIGNS LIST

10: upper member (first member)
100: torsion beam suspension
11: trailing arm component member
12: vehicle body connection
13: tire connection
14: spring connection
15: (upper member) beam connection (rigidity adjustment portion)
16: torsion beam
17: spring sheet
18: cross sectional shape change portion (rigidity adjustment portion)
20: lower member (second member)
21: upper connection (contact part)
22: (lower member) beam connection
23: inclined portion
24, 25: extension portion (rigidity adjustment portion)
30: collars
40: spindle
50: trailing arm
L1: line from tire side to axis of torsion beam
L2: axis of torsion beam
L3: line from vehicle body side to axis of torsion beam

The invention claimed is:

1. A torsion beam suspension having a first member including an opening whose section is formed to have a U-shape; and second members which are arranged in pair in a right and left direction when mounted on a vehicle and which contact the first member at an edge portion of the U-shaped section in the first member, the torsion beam suspension comprising:

right and left trailing arms which extend in a front-rear direction of the vehicle and are capable of swinging vertically, the trailing arms being formed with a pair of component members arranged at the right and left of the first member when mounted on the vehicle and being formed with the pair of the second members; and a U-shaped torsion beam whose section has an opening and which is arranged between the pair of component members, wherein two or more types of rigidity adjustment portions, which adjust a rigidity from the trailing arms to the torsion beam when the torsion beam is twisted, are disposed with positions of the rigidity adjustment portions displaced from each other, one of the rigidity adjustment portions is configured with a beam connection which connects with the torsion beam in the second member, the beam connection includes two or more extension portions extending from a contact part at which the second member contacts the first member to a bottom of the U-shaped section of the torsion beam, and the extension portions are configured astride the axis of the torsion beam to have different lengths.

2. The torsion beam suspension according to claim 1, wherein the extension portions are arranged such that a part having a shorter distance from an axial center of a tire has a higher rigidity.

3. The torsion beam suspension according to 1, wherein the extension portions are arranged to have different rigidities centered around an axis of the torsion beam.

4. The torsion beam suspension according to 1, wherein the first member is formed by a method of a tailored blank configured with two or more plate materials each having a different plate thickness, and one of the rigidity adjustment portions is configured with a part at which the plate thickness of the two or more plate materials is switched in the first member.

5. The torsion beam suspension according to 1, wherein one of the rigidity adjustment portions is configured by continuously changing a shape of a section crossing an axis direction from the component members to the torsion beam in the first member.

* * * * *